Figures 1, 2:
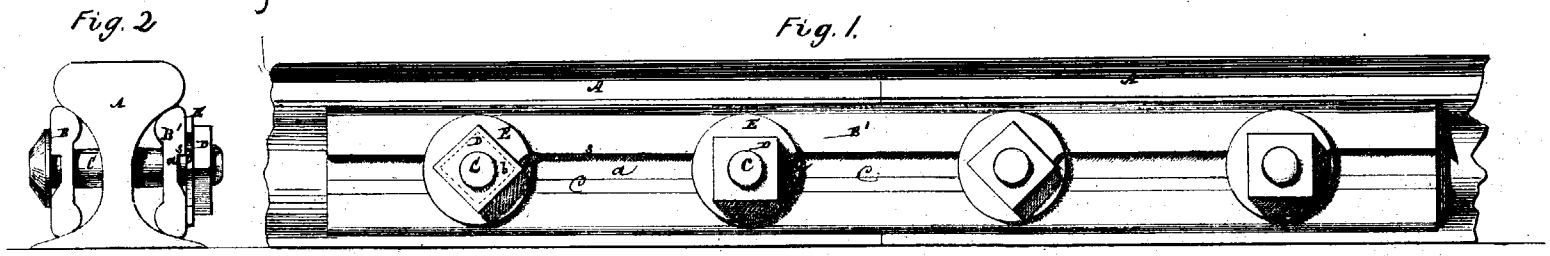

P. L. GIBBS.

Improvement in Lock Nuts.

No. 4,412.

Reissued June 6, 1871.

Witnesses.
W. Fred Haynes
R. R. Rabeau

Pierre L. Gibbs
per Brown Coombs & Co
Attorneys

AM. PHOTO-LITHOGRAPHIC CO. N.Y. (OSBORNE'S PROCESS)

UNITED STATES PATENT OFFICE.

PIERRE L. GIBBS, OF DUNLEITH, ILLINOIS.

IMPROVEMENT IN LOCK-NUTS.

Specification forming part of Letters Patent No. 96,218, dated October 26, 1869; reissue No. 4,412, dated June 6, 1871.

*To all whom it may concern:*

Be it known that I, PIERRE L. GIBBS, of Dunleith, in the county of Jo Daviess and State of Illinois, have invented a new and useful Improvement in Lock-Nuts, more especially applicable to the fish-plates of rail-joints; and I do hereby declare that the following is a full, clear, and exact description thereof, reference being had to the accompanying drawing forming part of this specification, and in which—

Figure 1 represents a side view of a fish-joint of two railway-bar lengths or sections with my improvement applied thereto, and Fig. 2 an end view of the same.

Similar letters of reference indicate corresponding parts.

My improvement relates to nut-locking arrangements or devices that, being advantageously applicable to securing fish and other similar railroad joints, will here be described accordingly. The invention, as applied to securing rail-joints, consists in a certain combination, with suitably-formed plates used to establish the joints, and which, if desired, may be the fish-plates themselves, of nuts to the bolts that pass through said plate or plates and bar, such nuts having washers of malleable or soft metal so fitted or adapted to them as that said nuts and washers are made to turn together, so that on setting or bending the washers on their outside edges into the recesses in the plates the nuts are locked and prevented from working loose.

Referring to the accompanying drawing, A A represent two lengths or sections, in part, of a rail, arranged to fit end to end, and B B outside plates or strips, used to secure the joints in the rail by means of transverse bolts having nuts on their ends, and arranged to pass through the plates and sections of rail lying in between them, such plates forming, for the purpose of illustration, the fish-plates of the joint. Both plates B B may be of similar construction; but reference need only be made here in particular to the one plate or strip, B′, which is shown recessed, or formed, if preferred, with a longitudinal groove, *a*, on its outside, the lower shoulder of which groove may be beveled downward for purposes hereinafter explained. C C are the transverse bolts used to secure the joint, and arranged to pass through both plates B B′ and sections A A of the rail lying in between them. D D are the nuts to the bolts C C. These nuts have washers E so adapted to them as to turn in common with the nuts. One simple and convenient means of effecting this is to construct the nuts with a square or angular rabbet, *b*, on their inside face, and to correspondingly shape the hole in the washers, so that on fitting the latter over the rabbets of the nuts neither nut nor washer can turn independent of the other.

In establishing the joint the nuts D D are screwed up, as usual, on the bolts C C, and, when tight, the edges or outer portions of the washers E, which should be of suitable metal or material for the purpose, are set or bent, as at *c c*, and tamped over an edge, *s*, into the recess *a* of the plate, which prevents the nuts from turning or working loose.

To unscrew the nuts for the purpose of taking out the bolts a wedge or other device may, as one means of accomplishing the result, be introduced between the inside face of the groove *a* and set or bent portions *c c* of the washers, and force applied to the wedge to straighten such bent portions, when the nuts may be unscrewed from the bolts. As the set *c* may be given to the washers at any point in their circumference, it is obvious that the nuts may be locked at varied tightening points or distances on the bolts.

To facilitate tightening up the nuts, as wear or the lengthening of the bolts requires, without prying up the washer or its set portion, the lower edge of the groove *a* may be beveled, or other like provision made for turning the nut in its tightening direction, so that when thus screwed up it may again be locked by making a fresh set in its washer to underlap the upper edge of the groove.

What is here claimed, and desired to be secured by Letters Patent, is—

1. The combination of a nut and washer, fitted to turn together and take a bearing on or against a plate, so that by tamping the edge of the washer into or over the edge of a groove or recessed portion of the plate the nut will be prevented from working loose or becoming unscrewed, substantially as described.

2. The grooved plate B′, having the one edge of its groove *a* beveled, as described, in combination with the bolt or bolts C and nuts D screwing thereon, and fitted or provided with washers E so as to be capable of turning only with the nuts and of locking with the plate, essentially as herein set forth.

P. L. GIBBS.

Witnesses:
A. RUSSELL,
CHAS. C. GILMORE.